Nov. 23, 1954     G. B. LITCHFORD     2,695,405
OMNI-AZIMUTH ANTENNA SYSTEM
Original Filed Oct. 29, 1947     2 Sheets-Sheet 1
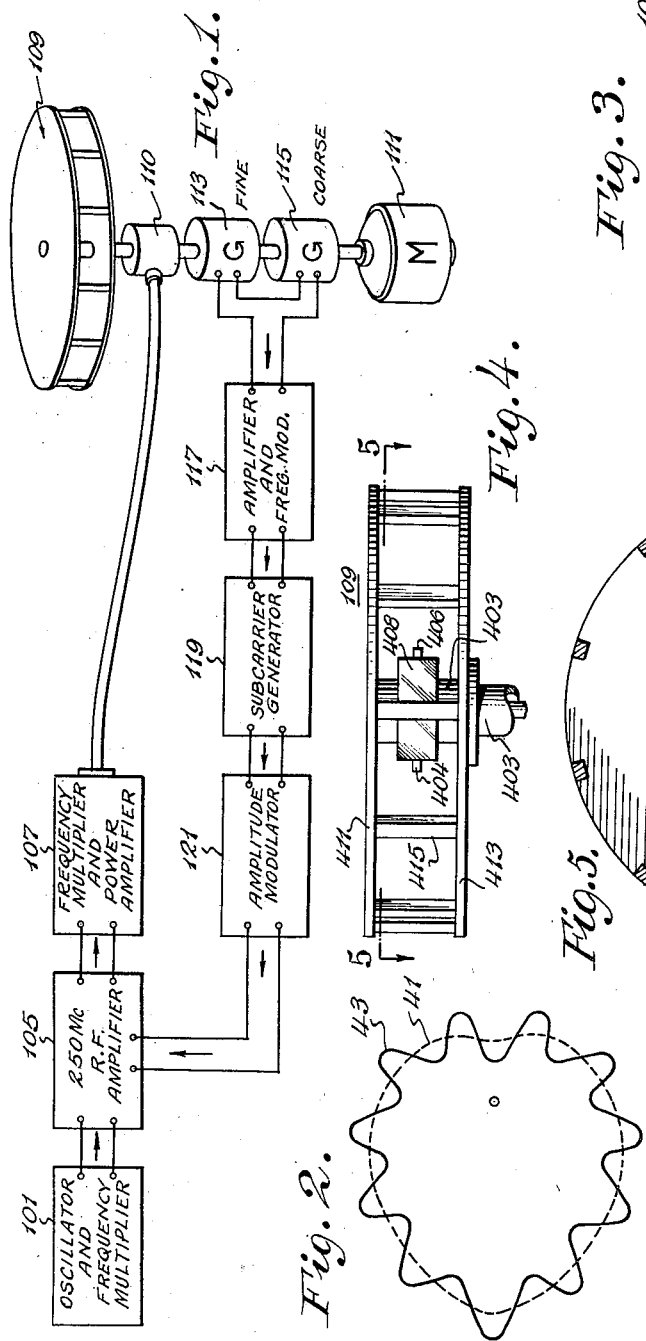
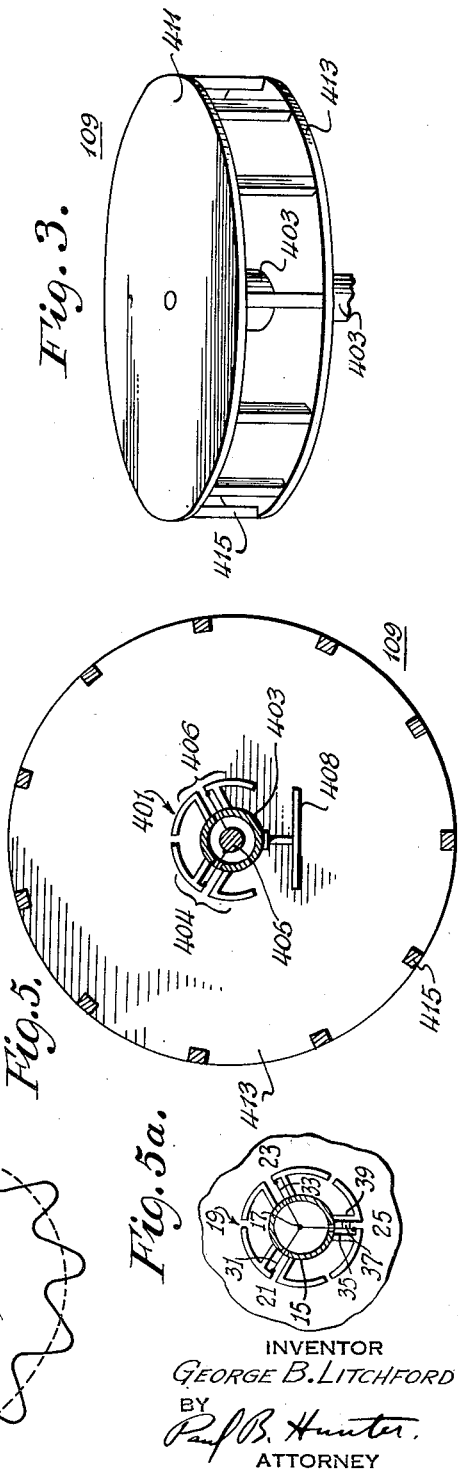
INVENTOR
GEORGE B. LITCHFORD
BY
ATTORNEY Nov. 23, 1954   G. B. LITCHFORD   2,695,405
OMNI-AZIMUTH ANTENNA SYSTEM
Original Filed Oct. 29, 1947                2 Sheets-Sheet 2
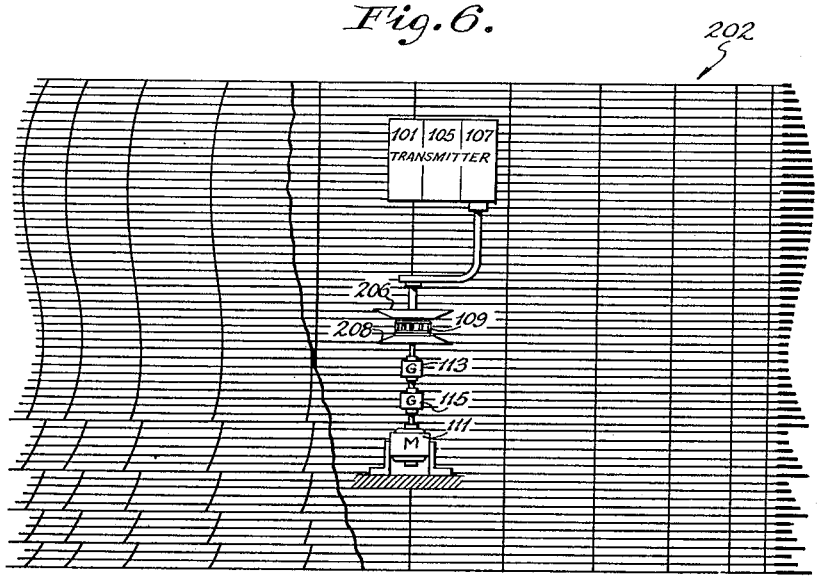
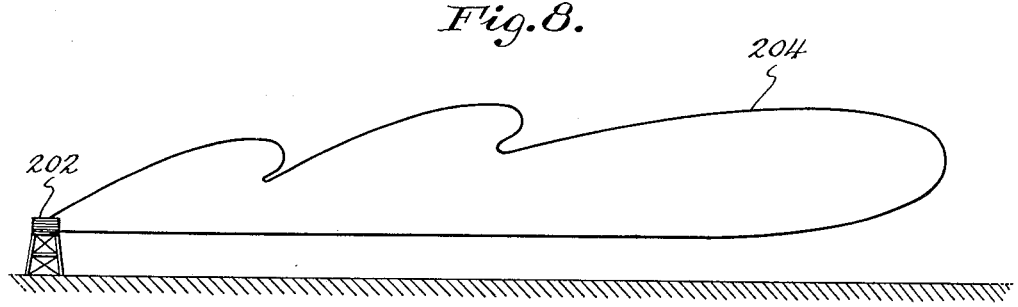
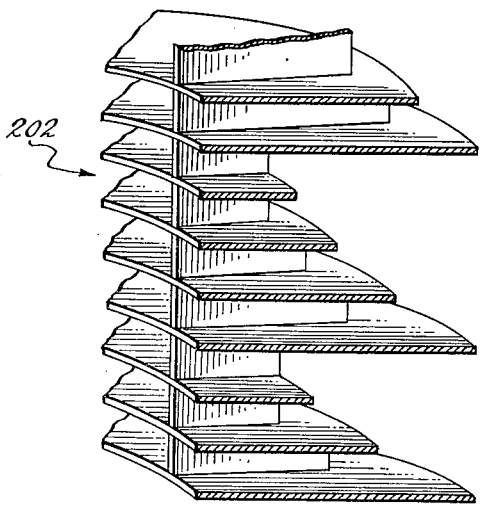
INVENTOR
GEORGE B. LITCHFORD
BY
Paul B. Hunter
ATTORNEY

United States Patent Office 2,695,405
Patented Nov. 23, 1954

2,695,405

OMNI-AZIMUTH ANTENNA SYSTEM

George B. Litchford, Cold Spring Harbor, N. Y., assignor to The Sperry Corporation, a corporation of Delaware Original application October 29, 1947, Serial No. 782,722. Divided and this application January 5, 1951, Serial No. 204,580

17 Claims. (Cl. 343—106)

The present invention relates to antenna systems and more particularly to antennas for a precision coarse and fine, omni-azimuth radio beacon. This application is a division of Patent No. 2,564,703 granted August 21, 1951, for an Omni-Azimuth Guidance System.

In the prior art, omni-azimuth direction reference systems have been constructed employing a rotating antenna pattern and a timing or reference wave transmitting arrangement; the associated craft-borne receiving equipment consisting of a radio receiver and a phase-comparison direction indicator, e. g. a phasemeter.

In such arrangements, azimuthal direction in terms of the azimuth bearing from the fixed station may be determined within an angle of a few degrees if care is exercised in the design and construction of the transmitting equipment and craft-borne receiving equipment. However, such systems are not sufficiently accurate where very close tolerance requirements must be met, as for example in air traffic control for modern high-speed aircraft in congested air traffic zones. Furthermore, obstacles such as buildings or sharp irregularities in the terrain within a radius of a few miles from the fixed transmitting station have been found to cause appreciable angular errors in the direction determinations afforded with these prior art systems. These troubles have been particularly noticeable where a large low-frequency fixed antenna array such as an Adcock array was supplied with successively-varied energy components for effecting vertical-axis rotation of a radiation pattern lobe.

An object of the present invention is to provide improved omni-azimuth direction reference apparatus.

Another object of the invention is to provide a rotatable coarse and fine radiation pattern.

A more specific object is to provide an antenna for omni-azimuth direction reference system characterized by more precise angular indication than heretofore obtainable with omni-azimuth systems of single-lobe radiation patterns, and of accuracy capabilities in high contrast to those of prior, low frequency systems.

Yet a further object is to provide an omni-azimuth direction determining antenna system wherein tendencies toward introduction of azimuth indication errors due to the presence of electromagnetic wave reflecting building or hills or other irregularities of the terrain in the neighborhood of the fixed reference station are substantially eliminated.

The present invention overcomes the above shortcomings or prior omni-azimuth systems by the arrangement of the transmitting antenna to provide a rotating pattern characterized not only by a single-lobe or limacon-like general form but also by a scalloped or multi-fingered outline superimposed thereon, and by transmission and reception of two reference phase signals of integral frequency ratio. One of the reference signals has a period equal to the period of rotation of the directive pattern and the other has a period shorter than the period of the first, in the ratio of the number of fingers superimposed upon the general shape of the lobe. In the craft-borne receiving equipment, the phases are compared both as to the long-period waves and as to the short-period waves introduced by the several fingers, and high azimuthal accuracy is achieved as well as greatly reduced error due to obstacles or irregular terrain. This accuracy and independence of terrain errors is enhanced by reliance upon physical rotation of such parts of the antenna system as are instrumental in determining the azimuthal energy distribution pattern, and by controlling the vertical-plane energy distribution pattern in such a way as to concentrate most of the transmitted energy in angles of elevation above the horizontal.

Referring now to the drawings,

Fig. 1 is a diagram of an omni-azimuth transmitting station.

Fig. 2 is a polar plot of the azimuthal intensity distribution pattern radiated by the transmitting antenna in Fig. 1;

Figs 3, 4 and 5 are oblique, elevation and sectional views, respectively, of an antenna unit suitable for generating the azimuthal pattern of Fig. 2.

Fig. 5a is an alternative three-dipole antenna unit which may be employed in the antenna of Fig. 5 instead of the double arcuate dipole and reflector antenna unit.

Fig. 6 is an elevation of the entire fixed-station antenna system, parts being broken away to show the construction thereof;

Fig. 7 is an enlarged view of a section of the lens incorporated in the antenna system of Fig. 9; and Fig. 8 is a vertical-plane directivity pattern resulting from the use of the antenna system of Fig. 9.

In the fixed transmitting station of Fig. 1, an oscillator and frequency multiplier unit 101 is provided for supplying radio-frequency excitation power to a radio frequency amplifier 105 having its output circuit arranged to drive a frequency multiplier and radio frequency power amplifier 107. The power amplifier 107 supplies output power through a coupling 110 to a rotatably supported antenna system 109 arranged to be rotated at high speed by a driving motor 111, e. g. at 1650 R. P. M.

The transmitting antenna 109 is illustrated in Fig. 3 as constructed in a shape generally resembling a vertical-axis drum, and the details of this antenna may be as shown in Figs. 3–5, for producing an azimuthal radiant energy distribution pattern generally according to Fig. 2.

The rotatable transmitting antenna 109 is of such design as to provide an azimuthal radiation pattern substantially as shown in Fig. 2. This pattern is characterized by a scallop plane of $n$ fingers, where $n$ is preferably an odd number, e. g. 11. Such a pattern may be produced by the use of a double arcuate dipole and reflector central antenna with a special $n$-finger pattern fringe modifier, as shown in Figs. 3, 4 and 5. Two arcuate doublet or dipole parts 404 and 406 are provided (see especially Fig. 5), each having one arcuate arm connected to the outer sheath 403 of a coaxial feed line and the other arm connected to the inner conductor 405 of the coaxial line. These arcuate dipoles each occupy a 120° sector about the vertical axis of the system, at a radius of approximately ¼ wavelength. A conductive reflector plate 408 is supported on an arm extending back from the outer sheath 403, this plate being spaced approximately ¼ wavelength from the axis of the system and being positioned directly opposite the two arcuate dipoles. The dimensions of the reflector plate, in terms of wavelength, may be approximately ¼ wavelength high by ½ wavelength wide. The central unit comprising antenna elements 404, 406, and 408 produces a limacon pattern, the shape of which is indicated in dotted line 41 in Fig. 2.

These elements are positioned at the middle of a drum formed with upper and lower conductive plates 411 and 413, which serve together as a wave guide for guiding the energy from the central unit 401 to the peripheral aperture. Vertical staves or columns such as column 415 are provided for distorting the fringe of the limacon-shaped pattern in such a manner as to provide $n$ scallops or fingers therearound for achieving "fine-and-coarse" modulation frequency control features, the resultant azimuthal directivity pattern of unit 109 being as shown at 43 in Fig. 2. These $n$ vertical bars may be made of dielectric material or of a semi-conductor, as desired, since the fringing can be accomplished by any such elements as will cause regular alternations around a circular locus of the phase velocity of energy emerging between the peripheries of plates 411 and 413.

An alternative central antenna unit 19 shown in Fig. 5a may be employed instead of the double arcuate dipole and reflector antenna unit 401 shown in Fig. 5. This alternative antenna unit comprises three dipole or doublet antenna portions 21, 23 and 25, as shown in Fig. 4 of my application S. N. 782,721, filed October 29, 1947, now Patent 2,567,220. Each of the dipole portions have two arcuate arms rigidly supported on parallel arms extending outward from the outer conductor 15. Alternate arcuate arms, e. g. the clockwise arcuate arms of the dipoles 21, 23, 25 are connected by radial conductors 31, 33 and 35 to the inner conductor 17 of the coaxial transmission line. These radially extending conductors pass through clearance holes in the outer conductor 15.

A shorting bar 37 is provided for affording a current path between radial conductor 35 and the substantially radial rigid arm 39. Without such a bar 37, the three arcuate dipole systems 21, 23, and 25 would be energized cophasally and in equal intensities, producing a generally circular intensity pattern. The shorting bar 37 is provided for distorting the radiation pattern of the antenna unit 19, to reduce the intensity in the direction of conductor 35, and to give the radiation pattern a general limacon-like character. The nature of the radiation pattern produced by the inner unit 19 alone is illustrated in dotted line at 41, Fig. 2, the minimum-radius portion thereof corresponding to the direction of the radial conductor 35.

Returning now to Fig. 1, two alternating voltage generators 113 and 115 are coupled to antenna 109 so that their rotors revolve in fixed relation therewith. These generators may comprise permanently magnetized rotors and cooperating stator output coils. Generator 115 is provided with a two-pole permanently magnetized rotor, while generator 113 is provided with a rotor characterized by $n$ pairs of poles, or a stator made up of $n$ dual-pole sections. Generator 115 produces output voltage at the frequency of rotation of antenna 109, while generator 113 produces output voltage of $n$ times the frequency of rotation. For this purpose, generator 113 may if desired be a simple generator geared to the rotor of generator 115 through $n$ ratio gears. The voltage from generator 115 provides a reference for comparison with the rotation frequency modulation component due to the general limacon-like shape of the antenna pattern, and the output voltage of generator 113 provides a phase reference signal for phase comparison with the high frequency amplitude modulation component observed in any azimuth direction due to the $n$ scallops around the fringe of the directional pattern.

These reference phase voltages from generators 113 and 115 are added and amplified in unit 117, and impressed by frequency modulation upon a subcarrier signal generated in an oscillator unit 119. This frequency modulated subcarrier signal is in turn supplied to the input terminals of an amplitude modulator 121 coupled to unit 105 for introducing subcarrier modulation into the output energy radiated through antenna 109. The subcarrier modulation arrangement described above is merely illustrative of the arrangements which may be used for transmitting phase reference signals to the craft. Another way to accomplish the phase reference signal transmission is by frequency modulation of unit 101 according to the phase reference signal wave, as set forth in U. S. Patent 2,377,902 to M. Relson.

A receiving system and azimuth direction indicator for responding to the transmitter of Fig. 1 is set forth in the above mentioned Patent 2,564,703.

To attempt to extend the rotatable antenna unit into a structure of great height for sharp vertical-plane directivity would be difficult, and would involve serious problems in making such a system dynamically balanced for high speed rotation. According to a further feature of the present invention, the sharp vertical-plane directivity is accomplished without any vertical extension of the rotating unit, by a cylindrical lens system which surrounds the rotating antenna unit 109 and remains stationary. This permits the multi-fingered and limacon-like pattern to be revolved according to the rotation of the vertically pivoted antenna unit, and affects only the vertical-plane energy distribution.

Such a lens system is illustrated at 202 in Figs. 6 and 7. This lens system surrounding the rotatable antenna 109 provides a vertical-plane directivity pattern as illustrated at 204 in Fig. 8. The complete antenna system is shown in a vertical elevation view in Fig. 6, parts being broken away to provide a clearer view of the honeycombed construction of the cylindrical lens and also to show the position of the rotatable antenna unit in relation thereto, and a portion is shown in magnified view in Fig. 7. The rotated structure may be supplemented, if desired, by a biconical horn 206, 208, for concentrating the energy from the rotatable antenna unit 109 toward the inner cylindrical boundary of the lens 202. Biconical horn 206, 208 preferably is made stationary, with slight clearance for freedom of rotation of unit 109.

The horizontal membranes of the lens 202 are made up as annular metallic discs which may be made with their inner diameters uniform and their outer diameters varied as required according to known ultra-high-frequency lens design techniques.

The antenna system may be supported on a tower and the lens there aids in preventing energy going downward to impinge on roofs of low buildings, e. g. hangars, to be reflected therefrom and tend to introduce minute angular error in the system indications.

Representative dimensions for the antenna system for operation at a frequency of the order of 5000 megacycles are as follows:

Outer diameter of coaxial line 403, 405, ⅝".
Diameter of drum unit 109, 10".
Radius of the dipole arms, ¾".
Spacing of the reflector from the axis to the shaft, ¾".
Height of the reflector, ½".
Length of the reflector, 1¼".
Spacing between the upper and lower discs of the rotating drum, 2".
Height of the lens system, 15'.
Diameter of the lens system, 25'.
Location of the drum, approximately central in the lens system.
Vertical spacing of the horizontal membranes in the lens system, 1½".
Angular spacing between radial vertical fins in the lens system, approx. 70°.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:
1. An antenna system comprising two substantially circular mutually parallel conductive plates spaced apart along a common axis, means for emitting ultra-high-frequency energy at the substantially central region between said plates for radial propagation of said energy to the peripheral region and thence into external space, and phase front distorting means for introducing a plurality of similar variations of phase delay in the radial propagation at regular angular intervals around the peripheral region between said plates.

2. An antenna system as defined in claim 1, wherein said ultra-high-frequency energy emitting means comprises means for directing energy in a limacon-like pattern to define opposite directions of maximum and minimum intensity and regular gradations of intensity throughout the 180° angular ranges of directions therebetween.

3. An antenna system as defined in claim 2, wherein said energy directing means comprises at least one set of three doublets each fed by a two-conductor radial feeder, the three doublets together with said feeders lying in a plane parallel to said parallel plates, at least one of the feeder conductor pairs being shorted, and an ultra-high-frequency energy source being connected to at least one of said feeder conductor pairs.

4. An antenna system as defined in claim 3, wherein each arm of each of said doublets is arcuate and all of the six arms of said three doublets are oriented in successive 60° arcs of a circle in said plane.

5. An antenna system as defined in claim 4, wherein said phase front distorting means comprises a plurality of columns extending between said plates in the region of their peripheries and spaced at intervals of substantially equal angles around said axis.

6. Radiator apparatus for producing a rotating asymmetrical azimuthal pattern for craft guidance, comprising a vertical-axis rotatable antenna assembly characterized by an asymmetrical energy distribution about said vertical axis, and an annular ultra-high-frequency lens surrounding said assembly coaxially therewith for restricting the vertical plane energy distribution to a predetermined vertical-plane pattern.

7. Radiator apparatus as defined in claim 6, further including a biconical first vertical pattern energy director coaxially surrounding said rotatable antenna assembly internally of said annular lens for concentrating the energy from said assembly toward said lens.

8. Radiator apparatus for producing a rotating asymmetrical azimuthal pattern for craft guidance, comprising a vertical-axis rotatable antenna assembly characterized by an asymmetrical energy distribution about said vertical axis, and stationary annular directive means surrounding said rotatable assembly coaxially therewith for restricting the radiation directions to a narrow range of angles of elevation, said means being so arranged as to leave the azimuthal-plane energy distribution substantially unaltered.

9. In a coarse and fine omni-azimuth beacon system, means to radiate a first directional radiation pattern comprising a pair of dipoles and a reflector arranged to provide a limacon-shaped pattern, means to superimpose projections on said pattern comprising a plurality of vertical struts uniformly arranged in a circular manner about said dipoles, and a high speed motor connected to rotate said dipoles and said reflector to thereby provide a rotatable coarse and fine pattern.

10. An antenna system as defined in claim 9 wherein the means to radiate the coarse and fine pattern also includes a pair of parallel plate members disposed above and below the dipoles and the struts and arranged to restrict the vertical angle of the radiation pattern.

11. An antenna system as defined in claim 9 wherein the rotating dipoles and struts are disposed within a biconical horn.

12. An antenna system as defined in claim 10 wherein said rotating dipole struts and said parallel plates are enclosed within a stationary microwave lens for the purpose of restricting the vertical angle of the radiation pattern.

13. An antenna system having means to radiate a rotatable coarse and fine radiation pattern comprising, a plurality of rotatable radiating elements and a reflector for providing a directional pattern, a plurality of thin members uniformly arranged around said radiating elements for modifying said pattern to provide a plurality of projections around its edge.

14. An antenna system as defined in claim 13 wherein the means to radiate the coarse and fine patterns also includes a pair of parallel plate members disposed above and below said horizontal elements and arranged to restrict the vertical angle of the radiation pattern.

15. An antenna system as defined in claim 13 wherein the rotatable elements are disposed within a biconical horn.

16. An antenna system as defined in claim 14 wherein said rotatable elements and said parallel plates are enclosed within a stationary microwave lens for the purpose of restricting the vertical angle of the radiation pattern.

17. An antenna system for radiating a rotatable coarse and fine pattern comprising, a radiator and a reflector, at least one of which is rotatable, and a plurality of struts uniformly arranged about said radiator in the direction of radiation for providing a scalloped edge to the radiation pattern of said radiator.

References Cited in the file of this patent

UNITED STATES PATENTS

| Number | Name | Date |
| --- | --- | --- |
| 2,461,187 | Steinmann | Feb. 8, 1949 |
| 2,536,509 | Luck | Jan. 2, 1951 |

FOREIGN PATENTS

| Number | Country | Date |
| --- | --- | --- |
| 581,576 | Great Britain | Oct. 17, 1946 |